United States Patent
Wason et al.

(10) Patent No.: US 8,275,596 B2
(45) Date of Patent: Sep. 25, 2012

(54) METHOD FOR ROBUST STATISTICAL SEMICONDUCTOR DEVICE MODELING

(75) Inventors: Vineet Wason, Mountain View, CA (US); Jung-Suk Goo, Los Altos, CA (US); Zhi-Yuan Wu, Union City, CA (US); Ciby T. Thuruthiyil, Fremont, CA (US)

(73) Assignee: Globalfoundries Inc., Grand Cayman (KY)

(*) Notice: Subject to any disclaimer, the term of this patent is extended or adjusted under 35 U.S.C. 154(b) by 628 days.

(21) Appl. No.: 11/636,336

(22) Filed: Dec. 8, 2006

(65) Prior Publication Data

US 2008/0141189 A1 Jun. 12, 2008

(51) Int. Cl.
  *G06F 17/50* (2006.01)
(52) U.S. Cl. .......................... 703/14; 716/100
(58) Field of Classification Search ............... 703/14
  See application file for complete search history.

(56) References Cited

U.S. PATENT DOCUMENTS

| | | | |
|---|---|---|---|
| 5,724,251 A * | 3/1998 | Heavlin | 716/102 |
| 5,761,481 A * | 6/1998 | Kadoch et al. | 703/2 |
| 5,886,906 A * | 3/1999 | Tatsumi et al. | 703/14 |
| 6,321,183 B1 * | 11/2001 | Tatsumi | 703/14 |
| 6,560,568 B1 * | 5/2003 | Singhal et al. | 703/2 |
| 6,770,494 B1 * | 8/2004 | Woloszyn et al. | 438/14 |
| 7,171,346 B1 * | 1/2007 | Recker et al. | 703/14 |
| 7,220,990 B2 * | 5/2007 | Aghababazadeh et al. | 257/48 |
| 7,640,143 B2 * | 12/2009 | Bittner et al. | 703/2 |
| 7,650,580 B2 * | 1/2010 | Kucukcakar et al. | 716/100 |
| 7,673,260 B2 * | 3/2010 | Chen et al. | 716/106 |
| 7,792,595 B1 * | 9/2010 | Bomholt et al. | 700/29 |
| 2002/0035462 A1 * | 3/2002 | Kidera et al. | 703/14 |
| 2003/0114944 A1 * | 6/2003 | Bernstein et al. | 700/97 |
| 2005/0043908 A1 * | 2/2005 | Bhavnagarwala et al. | 702/64 |
| 2010/0217568 A1 * | 8/2010 | Takeuchi | 703/2 |

OTHER PUBLICATIONS

Roy et al, "Simulation of Combined Sources of Intrinsic Parameter Fluctuations in a "Real" 35nm MOSFET", Proceedings of ESSDERC, Grenoble, France, 2005.*
Duvivier et al, "Worst-Case SPICE Model Generation for a Process in Development Using Athena, Atlas, Utmost and Spayn", 13th International Conference on Microelectronics, Rabet, Morocco, Oct. 29-31, 2001.*
Chatterjee et al, "Modelling of Small MOS Devices and Device Limits", IEE Proc. vol. 130, Pt. 1, No. 3, Jun. 1993.*
Power et al, "Relating Statistical MOSFET Model Parameter Variabilities to IC Manufacturing Process Fluctuations Enabling Realistic Worse Case Design", IEEE Transactions on Semiconductor Manufacturing, vol. 7, No. 3, Aug. 1994.*

(Continued)

*Primary Examiner* — Mary C Jacob
(74) *Attorney, Agent, or Firm* — Farjami & Farjami LLP

(57) ABSTRACT

According to one exemplary embodiment, a method for robust statistical semiconductor device modeling includes building a semiconductor device model using at least one new device parameter variation, constructing a variation library for the semiconductor device model, and verifying the variation library against measured data from physical semiconductor devices. The variation library is constructed by determining variations of the at least one new device parameter variation and standard device parameters as functions of, for example. sizes and locations of semiconductor devices on semiconductor dies.

17 Claims, 3 Drawing Sheets

OTHER PUBLICATIONS

Roy et al, "A Methodology for Quantitatively Introducing "Atomistic" Fluctuations into Compact Device Models for Circuit Simulation", Journal of Computational Electronics, 2: 427-431, 2003.*

Rappitsch et al, "SPICE Modeling of Process Variation Using Location Depth Corner Models", IEEE Transactions on Semiconductor Manufacturing, vol. 17, Issue 2, pp. 201-213, 2004.*

Chew et al, "A New Methodology for Concurrent Technology Development and Cell Library Optimization", Proceedings of the 12th International Conference on VLSI Design-'VLSI for the Information Appliance', 1999.*

Mahmoodi et al, "Estimation of Delay Variations due to Random-Dopant Fluctuations in Nanoscale CMOS Circuits", IEEE Journal of Solid-State Circuits, vol. 40, No. 9, Sep. 2005.*

Springer et al, "Modeling of Variation in Submicrometer CMOS ULSI Technologies", IEEE Transactions on Electron Devices, vol. 53, No. 9, Sep. 2006.*

Doh et al, "A Unified Statistical Model for Inter-Die and Intra-Die Process Variation", International Conference on Simulation of Semiconductor Processes and Devices, Sep. 1-3, 2005.*

* cited by examiner

METHOD FOR ROBUST STATISTICAL SEMICONDUCTOR DEVICE MODELING

1. TECHNICAL FIELD

The present invention is generally in the field of semiconductors. More particularly, the invention is in the field of semiconductor device modeling.

2. BACKGROUND ART

Semiconductor device models, such as transistor models, are vital in achieving reliable performance from circuit designs using semiconductor devices. Moreover, semiconductor device models can significantly increase the efficiency of the circuit design process. As such, it is desirable to increase the accuracy of such semiconductor device models.

Conventional methods for generating semiconductor device models typically include building a "model card" (also referred to simply as a "model" in the present application) for the semiconductor device by extracting standard device parameters from a measured data set. Simulation data provided by the semiconductor device model is then compared to measured data obtained from physical semiconductor devices to verify the accuracy of the semiconductor device model. However, such a model (or "model card") fails to provide for new device parameters, and further fails to provide for variations in standard and new device parameters as a result of, for example, different sizes of the semiconductor devices and/or their different positions on a die. Consequently, the semiconductor device models generated using conventional methods may be highly inaccurate.

SUMMARY

A method for robust statistical semiconductor device modeling, substantially as shown in and/or described in connection with at least one of the figures, and as set forth more completely in the claims.

DETAILED DESCRIPTION OF THE INVENTION

The present invention is directed to a method for robust statistical semiconductor device modeling. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
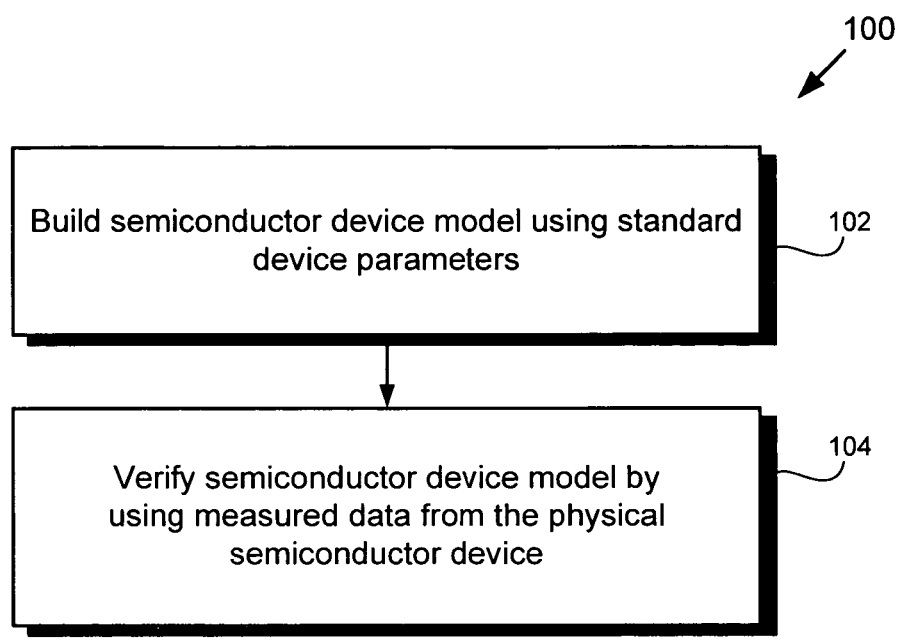
FIG. 1 shows a flowchart illustrating typical steps taken to implement a conventional method.

FIG. 1 illustrates flowchart 100 for performing a conventional method for generating a model of a semiconductor device. As shown in FIG. 1, at step 102 of flowchart 100, a model card is built for a semiconductor device, also referred to simply as a "semiconductor device model" in the present application, by extracting one or more standard device parameters from a finite data set acquired by measurement. The standard device parameters can include various electrical properties of the semiconductor device. For example, if the semiconductor device being modeled is a field effect transistor (FET), the standard device parameters can include transistor channel length (L), channel width (W), and/or threshold voltage (Vth).

To determine each standard device parameter in the conventional method, various electrical properties of a semiconductor device situated on a die can be measured to acquire a finite data set. For example, while standard device parameters channel length (L) and width (W) are generally readily obtainable, other standard device parameters, such as threshold voltage (Vth), can be extracted from the measured data set using various techniques known in the art. Thus, the semiconductor device model represents a model that is extracted directly from a finite set of measured data, and which can be used to perform simulations of the semiconductor device.

It is noted that according to the conventional technique in flowchart 100, only standard device parameters are utilized, and there is no allowance for inclusion of new semiconductor device parameters and their variations. In the case of a FET, for example, variations in new device parameters such as the work function (WF), random dopant fluctuation (RDF), and line edge roughness (LER), are not accounted for. Moreover, disadvantageously, conventional semiconductor device models, such as conventional FET models, do not take into account variations of device parameters, for example variations in the threshold voltage (Vth) of a FET, as a function of the size of the semiconductor device and its location on the die.

As shown in FIG. 1, at step 104 of flowchart 100, the model of the semiconductor device is verified by performing simulations using the semiconductor device model to acquire a simulation data set. The simulation data set is then compared to data measured from the physical semiconductor device to determine the accuracy of the semiconductor device model.

Figure 2:
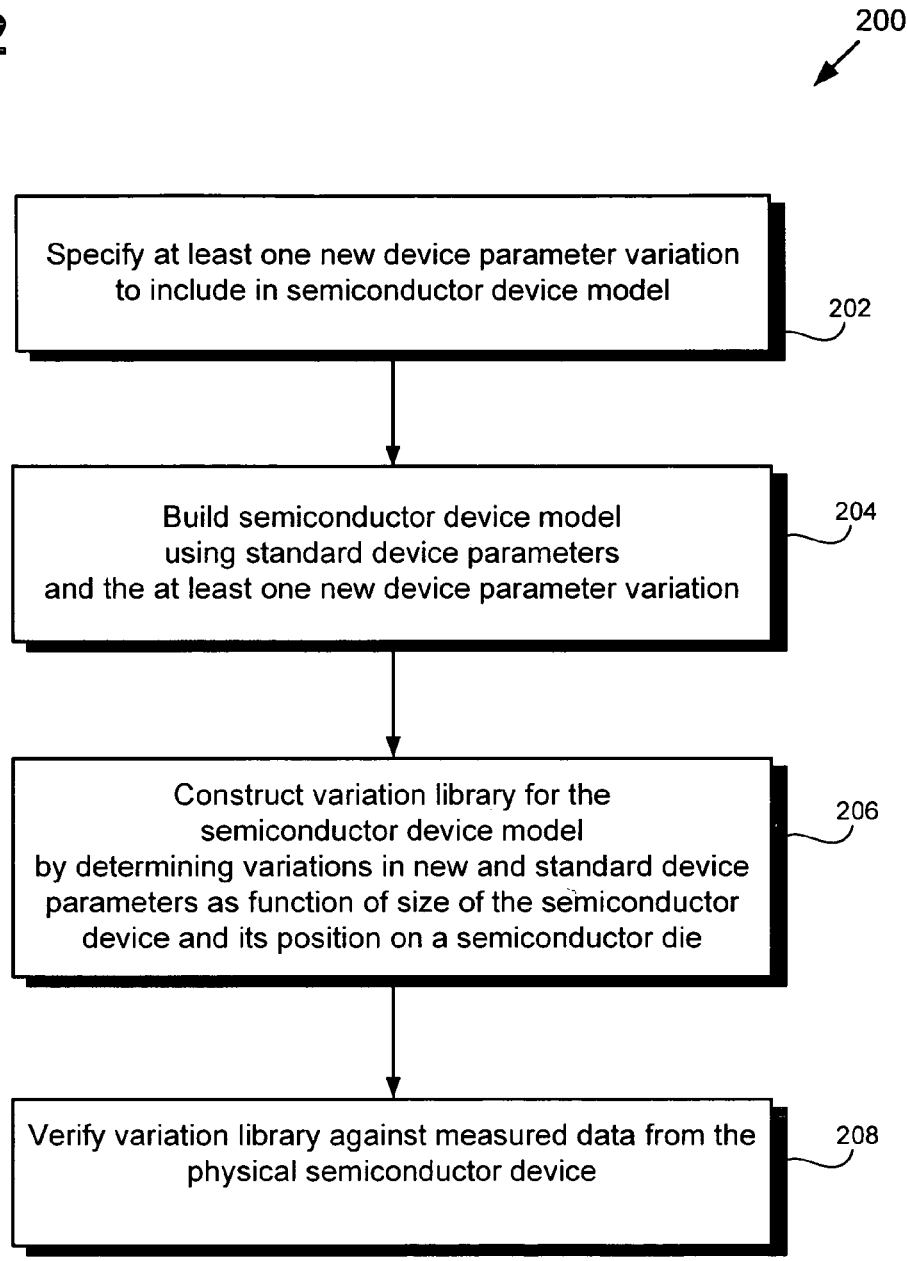
FIG. 2 shows a flowchart illustrating the steps taken to implement an embodiment of the present invention.

FIG. 2 shows flowchart 200 for performing a method for generating a robust statistical model of a semiconductor device in accordance with one embodiment of the present invention. At step 202 of flowchart 200, variation in at least one new device parameter to be included in the model of the semiconductor device can be specified. For example, if the semiconductor device being modeled is a FET, the specified new device parameters can include parameters due to work function (WF) variation, random dopant fluctuation (RDF), and/or line edge roughness (LER). It is noted that in one embodiment, no variations in new device parameters are specified and only variations in standard device parameters, for example, channel length (L), width (W), and/or threshold voltage (Vth), can be used prior to proceeding to step 204.

At step 204, a "model card," also referred to simply as a semiconductor device model in the present application, is built for the semiconductor device by using one or more standard device parameters from a finite data set acquired by measurement, as well as variation in any new device parameters previously specified in step 202. The standard and new device parameters can be obtained by measuring various electrical properties of the semiconductor device. If the semiconductor device being modeled is a FET, the standard device parameters might include, for example, channel length (L), width (W), and/or threshold voltage (Vth); while the new device parameters might include parameters related to work function (WF) variation, random dopant fluctuation (RDF), and/or line edge roughness (LER). Thus, the semiconductor device model corresponds to data extracted directly from a measured data set, which can eventually be used to perform simulations of the semiconductor device.

As shown in FIG. 2, at step 206 of flowchart 200, a variation library is constructed by determining variations in the standard and new device parameters of the semiconductor device as a function of, for example, the size of the semiconductor device and its position on the semiconductor die. For example, if the semiconductor device being modeled is a FET, a variation library is constructed by determining changes in standard device parameters, for example, channel length (L), width (W), and/or threshold voltage (Vth); as well as changes in any new device parameters, for example, work function (WF) variation, random dopant fluctuation (RDF), and/or line edge roughness (LER), as a function of the size of the FET and/or the position of the FET on a semiconductor die. For example, while two FETs laid out in close proximity might have nearly identical threshold voltages, FETs laid out in different corners of the die, might have slightly different threshold voltages.

In the embodiment described above, the variation library is constructed based on changes in standard and new device parameters as a function of both the size and location of the semiconductor device. However, in one embodiment, the invention's variation library can be constructed by determining changes in standard and new device parameters as a function of only the size of the semiconductor device; while in another embodiment the invention's variation library can be constructed by determining changes in standard and new device parameters as a function of only the location of the semiconductor device on a die.

The variation library is configured to communicate with the semiconductor device model to adjust the standard and new device parameters of the semiconductor device based on the size of the semiconductor device and/or the location of the semiconductor device on the die. Therefore, the variation library can advantageously increase the accuracy of the semiconductor device model by appropriately varying the standard and new device parameters to more accurately correlate to the actual semiconductor device electrical properties as a function of the size and/or the location of the semiconductor device on the die.

At step 208, the variation library is verified by determining the accuracy of the standard and new device parameters as a function of the size and/or position of the semiconductor device. Such verification may be performed by running simulations using the semiconductor device model and its associated variation library on semiconductor devices having different sizes and positions on the die, and then comparing the simulation results against measured data from the physical semiconductor devices with different sizes and positions on semiconductor dies. The simulation results can be checked against measured data from the physical semiconductor devices by, for example, evaluating the electrical properties of the semiconductor devices. For example, if the semiconductor device is a FET, electrical properties of the FET to be evaluated can include the saturation current (Idsat), the linear current (Idlin), and the saturation threshold voltage (Vtsat) of the transistor. Other electrical properties that are strongly correlated to the standard and new device parameters may also be used.

For example, to determine small statistical variations in standard and new device parameters that can exist between nearly identical semiconductor devices, such as between matched transistor pairs, situated close to each other on a semiconductor die, a substantial amount of measured data of the transistors' electrical properties may be required. Thus, numerous test structures that include such transistor configurations can be built in order to provide the requisite amount of measured data, thereby allowing the statistical variations in the standard and new device parameters of the closely situated transistors to be determined. These statistical variations can then be included in the variation library to improve the accuracy of each semiconductor device model. As such, the measured data can be used to further fine-tune and refine the construction of the variation library at step 206.

Thus, by including a variation library which takes into account variations in standard and new device parameters of a semiconductor device as a function of the size of the semiconductor device and/or the location of the semiconductor device on a die, the invention achieves semiconductor device modeling that is significantly more accurate than those provided by conventional methods discussed above. Consequently, the semiconductor device model along with its associated variation library achieved by the present invention can advantageously result in simulations with greater accuracy, thereby increasing design efficiency. Moreover, since the invention accounts for the variations in standard and new device parameters that are specific to a size and/or a location of a semiconductor device, the semiconductor device model and its associated variation library, as taught by the present invention, result in a more robust statistical modeling of the semiconductor device than previously achieved. The improved modeling and design of the semiconductor devices can also advantageously reduce the number of failures in the semiconductor devices during production, thereby increasing yield and reducing manufacturing costs.

Due to the improved accuracy of the invention's method in robust statistical semiconductor device modeling as described above, the design and/or fabrication of physical semiconductor devices can be significantly improved. In other words, results obtained from the invention's improved semiconductor device modeling can be utilized to aid engineers in significantly improving the design and/or fabrication of semiconductor circuits and production dies, resulting in an increase in production yield.

Figure 3:
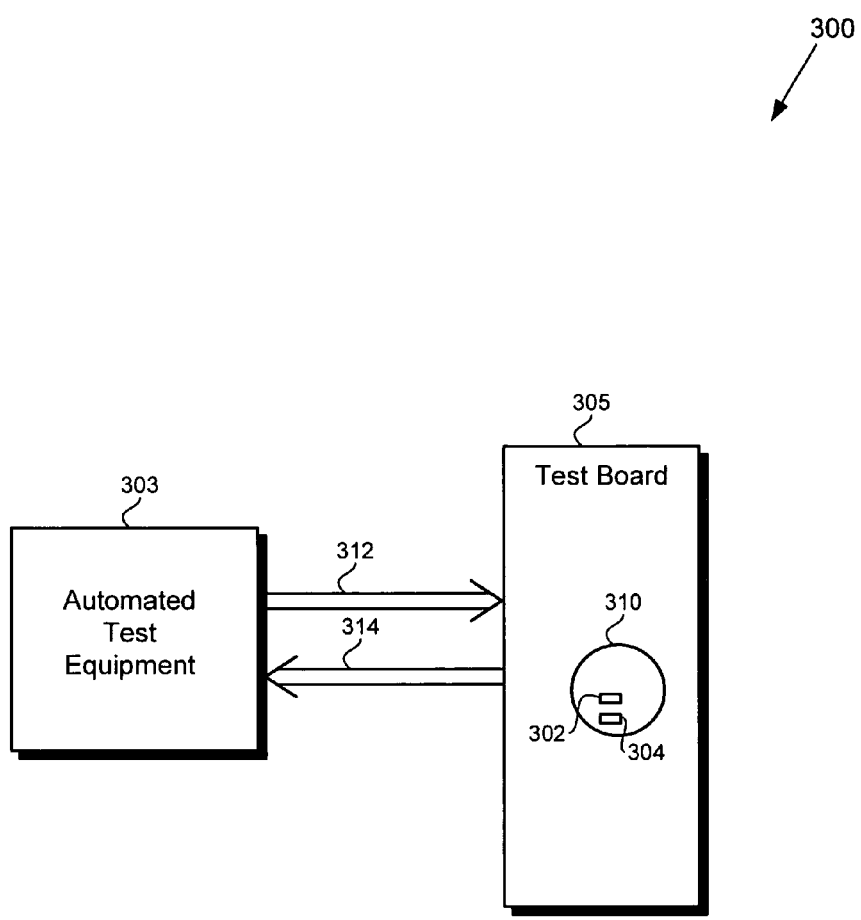
FIG. 3 shows an exemplary system including an exemplary wafer under test with one or more semiconductor devices to implement an embodiment of the present invention's method.

FIG. 3 shows an exemplary system 300 including an exemplary wafer under test 310 including multiple exemplary test dies, such as test dies 302 and 304, each with multiple semiconductor devices, in accordance with one embodiment of the present invention. System 300 is utilized to obtain sets of measured data to implement one or more embodiments of the invention's method for robust statistical semiconductor device modeling. In the embodiment shown, system 300 includes automated (i.e. computerized) test equipment 303 and test board 305. Test board 305 includes wafer under test 310, which can include test dies 302 and 304, where each test die includes a number of physical semiconductor devices of interest, for example a number of FETs. Wafer under test 310 can also include additional test dies (not shown in FIG. 3), which are similar to test dies 302 and 304.

As shown in FIG. 3, test board 305 is coupled to automated test equipment 303 by buses 312 and 314. Test board 305 can include a number of interconnect traces (not shown in FIG. 3) to couple signals to and from automated test equipment 303 to the appropriate contact points or contact pads on each test die and/or physical semiconductor device on wafer under test 310. In the present embodiment, wafer under test 310 is mounted on test board 305. In an alternative embodiment, wafer under test 310 may not be mounted on test board 305, and may be connected directly to automated test equipment 303 via a number of probes and buses 312 and 314.

Automated test equipment 303 is configured to apply suitable signals to, for example, test die 302 and to measure various electrical properties of semiconductor devices fabricated in test die 302. For example, if the semiconductor devices are FETs, automated test equipment 303 can be configured to apply suitable signals to measure the FETs' various electrical properties, such as saturation current (Idsat), linear current (Idlin), and saturation threshold voltage (Vtsat). Upon obtaining these and other electrical properties, system 300 can be utilized to aid in determining variations in standard and new device parameters in order to construct a variation library as discussed above. Moreover, system 300 can be used to verify the accuracy of the variation library by checking the predicted results of a semiconductor device model and its associated variation library against actual data measured from physical semiconductor devices as discussed above. As such, system 300 can be utilized to implement an embodiment of the invention's method for robust statistical semiconductor device modeling.

Due to the improved accuracy of the invention's method in robust statistical semiconductor device modeling as described above, the design and/or fabrication of physical semiconductor devices can be significantly improved. In other words, results obtained from the invention's improved semiconductor device modeling can be utilized to aid engineers in significantly improving the design and/or fabrication of semiconductor circuits and production dies, resulting in an increase in production yield.

It is apparent to one of ordinary skill in the art that the innovative method of the present invention for statistical semiconductor device modeling is, at least in some embodiments, implemented by a computer programmed with code to carry on various steps of the present invention's method as described above. For example, such computer can be a part of, and/or interface with or control, automated test equipment 303. Moreover, the code necessary to program such computer can of course be stored in and/or read from any computer-readable medium, such as a compact disk (CD), a digital video disk (DVD), a flash memory storage device, a hard disk, a random access memory (RAM), or a read only memory (ROM), as well as numerous other computer-readable media not specifically mentioned in this application.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a method for robust statistical semiconductor device modeling has been described.

The invention claimed is:

1. A method for execution in a processor of a computer, said method for robust statistical semiconductor device modeling, said method comprising the steps of:
   building a semiconductor device model using at least one standard device parameter and at least one new device parameter variation, wherein said at least one new device parameter variation is obtained, at least in part, from a data set acquired by measurement, and is related to a work function variation, a line edge roughness, or a random dopant fluctuation;
   constructing a variation library for said semiconductor device model, wherein said variation library is constructed based on changes in at least one new device parameter;
   running simulations using said semiconductor device model and said variation library, wherein said variation library is used to adjust parameters of said semiconductor device model;
   verifying said variation library based on a comparison between results of said simulations and measured data from a physical semiconductor device;
   fine-tuning said variation library based on said comparison.

2. The method of claim 1 further comprising using said semiconductor device model and said variation library to fabricate a semiconductor die.

3. The method of claim 1 wherein said constructing step comprises determining variations in said at least one new device parameter variation as a function of a size of said physical semiconductor device.

4. The method of claim 1 wherein said constructing step comprises determining variations in said at least one new device parameter variation as a function of a location of said physical semiconductor device on a semiconductor die.

5. The method of claim 1 wherein said constructing step comprises determining variations in said at least one standard device parameter as a function of a size of said physical semiconductor device.

6. The method of claim 1 wherein said constructing step comprises determining variations in said at least one standard device parameter as a function of a location of said physical semiconductor device on a semiconductor die.

7. The method of claim 1 wherein said measured data comprises electrical parameters of said physical semiconductor device.

8. The method of claim 1 wherein said physical semiconductor device is a FET.

9. The method of claim 8 wherein said at least one standard parameter is selected from the group consisting of a channel length, a channel width, and a threshold voltage.

10. The method of claim 8 wherein said measured data comprises at least one electrical parameter of said FET, wherein said at least one electrical parameter is selected from the group consisting of a saturation current, a linear current, and a saturation threshold voltage.

11. A non-transitory computer-readable medium containing program code, said program code adapted to configure said processor of said computer to execute the method of claim 1.

12. A computer-readable medium containing program code, said program code adapted to configure said processor of said computer to execute the method of claim 1, said computer-readable medium being selected from the group consisting of a compact disk (CD), a digital video disk (DVD), a flash memory storage device, a hard disk, a random access memory (RAM), and a read only memory (ROM).

13. A computer programmed with code to execute a method for robust statistical semiconductor device modeling, said computer configured to perform the steps of:
   building a semiconductor device model using at least one standard device parameter and at least one new device parameter variation, wherein said at least one new device parameter variation is obtained, at least in part, from a data set acquired by measurement, and is related to a work function variation, a line edge roughness, or a random dopant fluctuation;

constructing a variation library for said semiconductor device model, wherein said variation library is constructed based on changes in at least one new device parameter;

running simulations using said semiconductor device model and said variation library, wherein said variation library is used to adjust parameters of said semiconductor device model;

verifying said variation library based on a comparison between results of said simulations and measured data from a physical semiconductor device;

fine-tuning said variation library based on said comparison.

14. The computer of claim 13 wherein said computer controls an automated test equipment.

15. A system for robust statistical semiconductor device modeling, said system obtaining a set of measured data from a wafer under test, said wafer under test including a physical semiconductor device, said set of measured data being utilized by a processor of a computer of said system to implement a method for robust statistical semiconductor device modeling, said computer configured to perform the steps of:

building a semiconductor device model using at least one standard device parameter and at least one new device parameter variation, wherein said at least one new device parameter variation is obtained, at least in part, from a data set acquired by measurement, and is related to a work function variation, a line edge roughness, or a random dopant fluctuation;

constructing a variation library for said semiconductor device model, wherein said variation library is constructed based on changes in at least one new device parameter;

running simulations using said semiconductor device model and said variation library, wherein said variation library is used to adjust parameters of said semiconductor device model;

verifying said variation library based on a comparison between results of said simulations and said set of measured data from said physical semiconductor device;

fine-tuning said variation library based on said comparison.

16. The system of claim 15, wherein said system is configured to use said semiconductor device model and said variation library to fabricate a production die.

17. The system of claim 15, wherein said system is configured to use said semiconductor device model and said variation library to simulate performance of a production die.

* * * * *